(12) United States Patent
Chen et al.

(10) Patent No.: US 7,336,482 B2
(45) Date of Patent: Feb. 26, 2008

(54) MOUNTING APPARATUS FOR STORAGE DEVICE

(75) Inventors: Hsuan-Tsung Chen, Tu-chen (TW); Jun Li, Shenzhen (CN); Ying Sin William Tin, Shenzhen (CN); Pin-Shian Wu, Tu-Chen (TW)

(73) Assignees: Hong Fu Jin Precision Industry (ShenZhen) Co., Ltd, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 340 days.

(21) Appl. No.: 10/962,289

(22) Filed: Oct. 8, 2004

(65) Prior Publication Data

US 2005/0078445 A1  Apr. 14, 2005

(30) Foreign Application Priority Data

Oct. 9, 2003  (TW) .............................. 92218122 U (51) Int. Cl.
 *H05K 7/00* (2006.01)
(52) U.S. Cl. ...................................... 361/685; 361/727

(58) Field of Classification Search ................ 361/684, 361/685, 727
See application file for complete search history.

(56) References Cited

U.S. PATENT DOCUMENTS

| | | | | |
|---|---|---|---|---|
| 6,238,026 | B1 * | 5/2001 | Adams et al. | 312/223.2 |
| 6,273,532 | B1 * | 8/2001 | Chen et al. | 312/223.2 |
| 6,654,240 | B1 * | 11/2003 | Tseng et al. | 361/685 |
| 6,771,496 | B1 * | 8/2004 | Wu | 361/685 |
| 2003/0058612 | A1 | 3/2003 | Liu et al. | |
| 2003/0076652 | A1 * | 4/2003 | Ahn | 361/683 |

* cited by examiner

*Primary Examiner*—Jayprakash Gandhi
*Assistant Examiner*—Ingrid Wright
(74) *Attorney, Agent, or Firm*—Wei Te Chung (57) ABSTRACT

A mounting apparatus includes a storage bracket (30), an operating member (60), a locking member (50) and a pair of springs (70). The operating member has at least one slant portion (647). The locking member is restrained from moving along with the operating member. The locking member has at least one inserting pin (54) and at least one sliding tab (56). The springs press on the locking member to urge the inserting pin to extend into the storage bracket. The inserting pin of the locking member is lifted out of the storage bracket by the slant portion of the operating member edging the sliding tab of the locking member out, when the operating member is pushed.

20 Claims, 8 Drawing Sheets

MOUNTING APPARATUS FOR STORAGE DEVICE

BACKGROUND OF THE INVENTION

1. Field of the Invention

The present invention relates to a mounting apparatus for storage device, and particularly to a mounting apparatus which facilitates installation and removal of data storage device.

2. Description of the Related Art

A number of different methods and devices are used to mount data storage devices, such as disk drives or CD-ROMs, in a computer. One method that was widely used in the past was to simply screw the data storage device directly into a cage whereby the data storage device was secured in the computer. Changing the device was cumbersome because side or top panels, or other components close beside the cage had to be removed in order to remove the screws. New developments facilitate installation and removal of data storage devices. These include the use of guide rail type devices, such as those described below.

U.S. Pat. No. 5,262,923 and Taiwan Patent Application Nos. 78201813, 79209891 disclose devices employing guide rails for mounting data storage devices. However, the rails used in these devices are complicated and manufacturing the opposite side rails requires two sets of dies, which contributes significantly to the cost of these devices. Moreover, the side rails are attached to their data storage device by conventional screws. The problem of the time-consuming and cumbersome task of tightening or loosening screws is still not resolved.

U.S. Pat. No. 5,599,080 discloses a mounting device for a data storage device without screws. Its data storage device is secured by pushing pins integral with the rail into side holes in the data storage device. The pins are thin and flexible, and are rather easily bent during operations such as removing the data storage device from the computer. Once the pins become bent, subsequent alignment and reconnection of the data storage device to the cage can be quite difficult.

A data storage mounting device disclosed by Taiwan Patent Application No. 83202972 also has no screws. Its rail fastener is a spring metal thread whose two ends are bent for insertion through the rail and into the side holes of the data storage device. However, the spring metal thread is readily deformed, which may result in unreliable mounting. The second embodiment of Taiwan Patent Application No. 83202972 discloses an arrangement where the data storage device is directly attached to the cage of the computer by a spring metal thread. However, other devices or panels close to the cage create the problem of inconvenient access to the thread for installation or removal of the data storage device.

Therefore, there is a need for an improved apparatus for easily installing and removing data storage devices which overcomes the above-mentioned problems.

SUMMARY OF THE INVENTION

Accordingly, an object of the present invention is to provide a mounting apparatus for data storage device in a computer.

It is a further object of the present invention to enable easy and convenient installation and removal of computer data storage device.

To achieve the above-mentioned object, a mounting apparatus in accordance with the present invention comprises a storage bracket, an operating member, a locking member and resilient means. The operating member has at least one slant portion. The locking member is restrained from moving along with the operating member. The locking member has at least one inserting pin and at least one sliding tab. The resilient means urges the inserting pin of the locking member to extend into the storage bracket. The inserting pin of the locking member is lifted out of the storage bracket by the slant portion of the operating member edging the sliding tab of the locking member out, when the operating member is pushed.

Other objects, advantages and novel features of the present invention will be drawn from the following detailed description of a preferred embodiment of the present invention with attached drawings, in which:

DETAILED DESCRIPTION OF THE INVENTION

Figure 1:
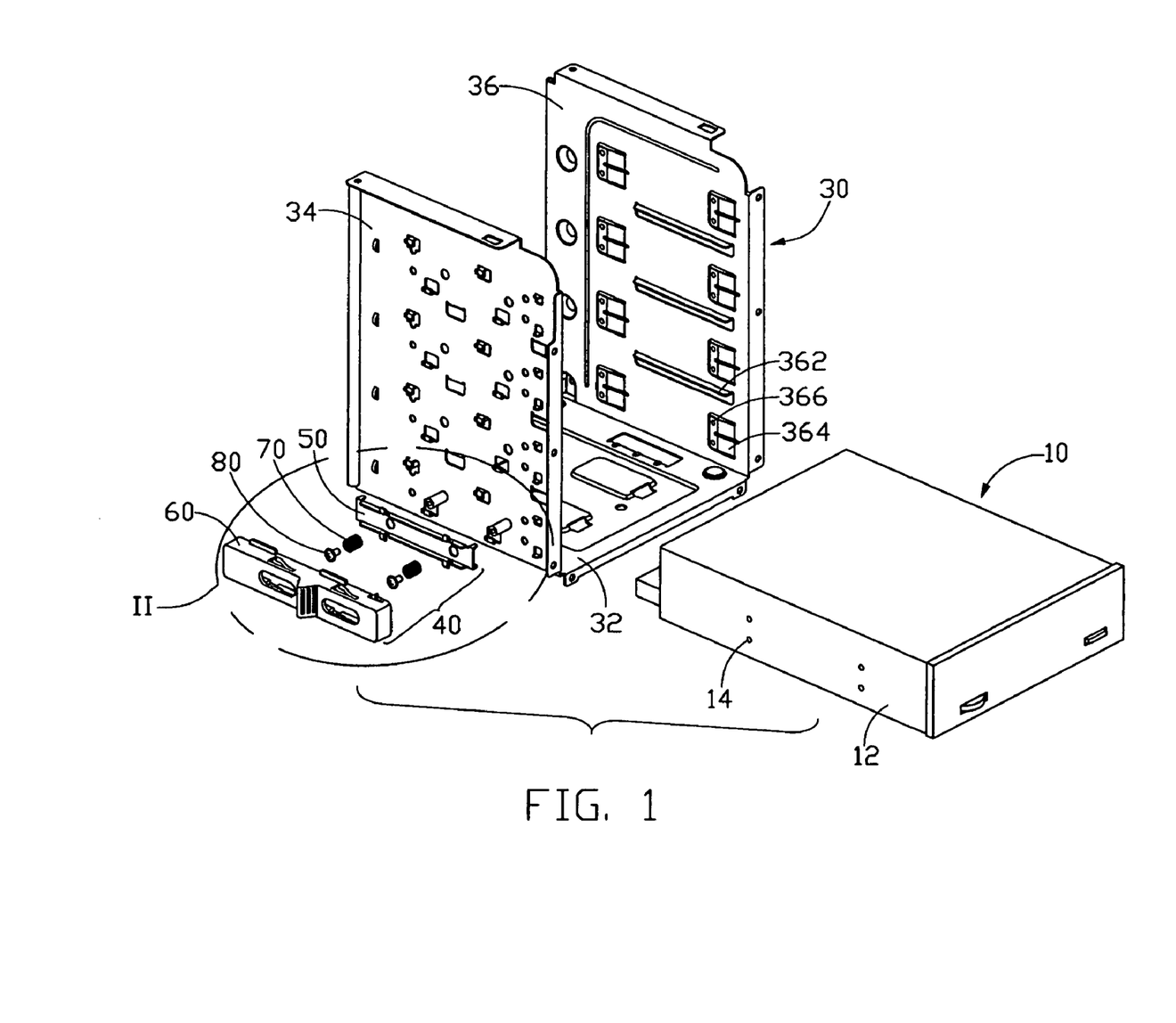
FIG. 1 is an exploded, isometric view of a mounting apparatus in accordance with the preferred embodiment of the present invention, together with a data storage device.

Referring to FIG. 1, a mounting apparatus in accordance with the preferred embodiment of the present invention comprises a storage bracket 30 and a securing means 40. A storage device 10 is secured to the storage bracket 30 by the securing means 40. The storage device 10 has two side walls 12 with two pairs of apertures 14 defined therein.

Figure 2:
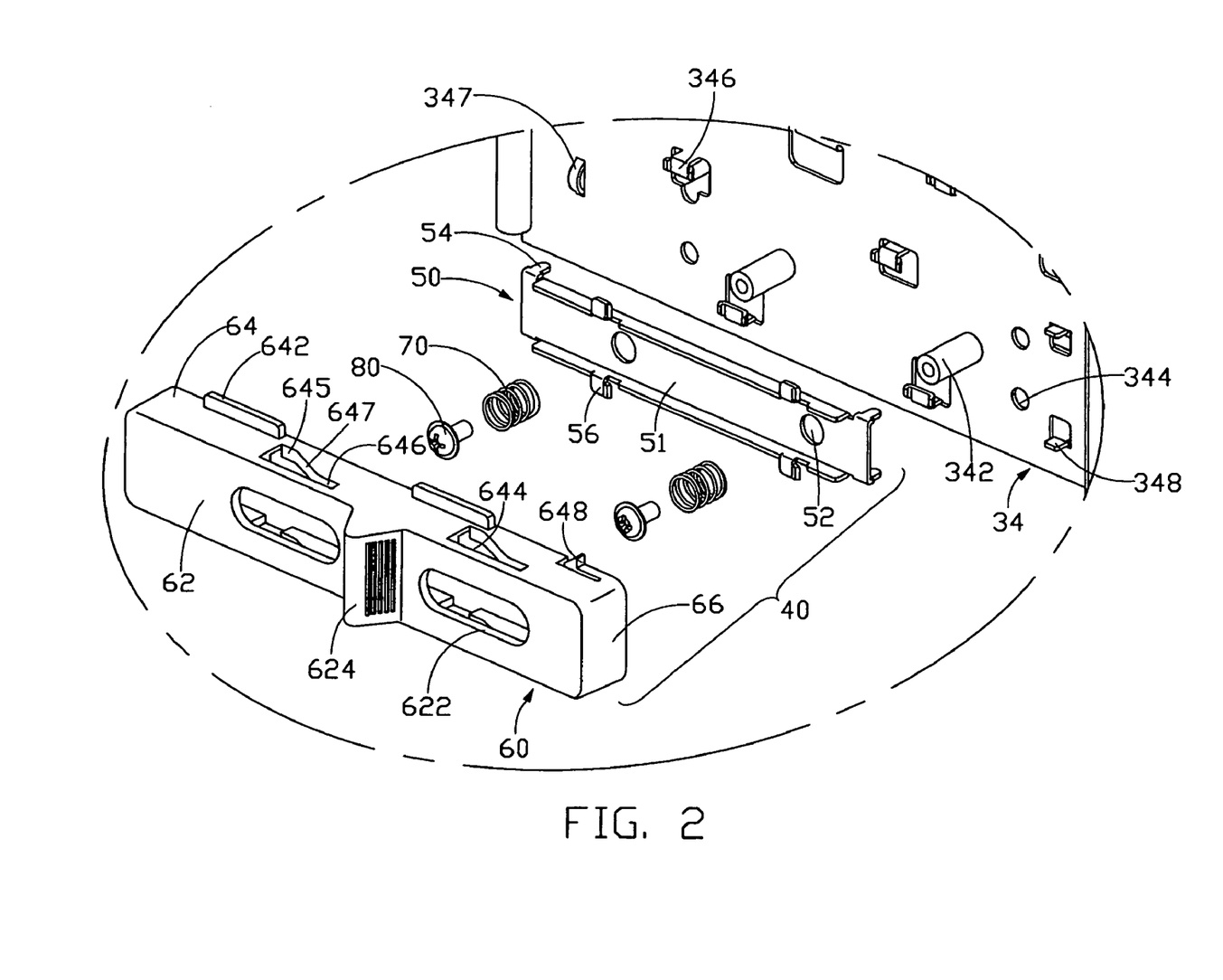
FIG. 2 is an enlarged view of an encircled portion II of FIG. 1.

The storage bracket 30 has a bottom panel 32, a first side wall 34 and a second side wall 36. Several bays are vertically defined between the first and second side walls 34, 36 for receiving storage devices therein. Corresponding to each bay, a bend 362 and a pair of resilient tabs 364 extend inwardly from the second side wall 36. Referring also to FIG. 2, corresponding to each bay, a boss 347 and a pair of limiting tabs 348 are punched outwardly from the first side wall 34 at two ends, for defining a range of the securing means 40. Between the boss 347 and the limiting tabs 348, two pairs of parallel guiding tabs 346 are vertically formed for guiding the securing means 40. The guiding tab 346 is L-shaped. Two pairs of through holes 344 are defined on the first side wall 34 for the securing means 40 projecting therein. A pair of nuts 342 is horizontally defined between the two pairs of through holes 344.

The securing means 40 includes a locking member 50, an operating member 60, a pair of springs 70 and a pair of screws 80. Referring to FIG. 2, the locking member 50 has an elongated body 51. A pair of apertures 52 is defined thereon for the nuts 342 of the first side wall 34 inserting through. Two pairs of inserting pins 54 extend out at the four corners of the body 51. The two pairs of inserting pins 54 are respectively corresponding to a through hole 344 on the first side wall 34. A pair of flanges is folded up from the body 51 in a direction opposite to the inserting pins 54. A pair of sliding tabs 56 is separately disposed at each flange. Each sliding tab 56 has a horizontal section and an inclined section for readily sliding.

The operating member 60 is a housing for receiving the locking member 50 therein. The housing of the operating member 60 is big enough for the locking member sliding therein (see FIG. 3). Referring to FIG. 2, the operating member 60 has a base 62, a pair of side walls 64 and a pair of end walls 66. A pair of cuneal slots 644 is lengthways disposed on each side wall 64. The hypotenuse of the slot 644 has a first horizontal portion 645, a slant portion 647, and a second horizontal portion 646 sequentially. A pair of rails 642 is disposed at the upper edge of each side wall 64 for sliding under the guiding tabs 346 on the storage bracket 30. A resilient hook 648 is formed at the upper corner of each side wall 64 corresponding to the limiting tab 348 on the storage bracket 30. A pair of openings 622 is lengthways defined on the base 62. A ridge 624 is transversely formed between the openings 600 for facilitate performance.

Figure 3:
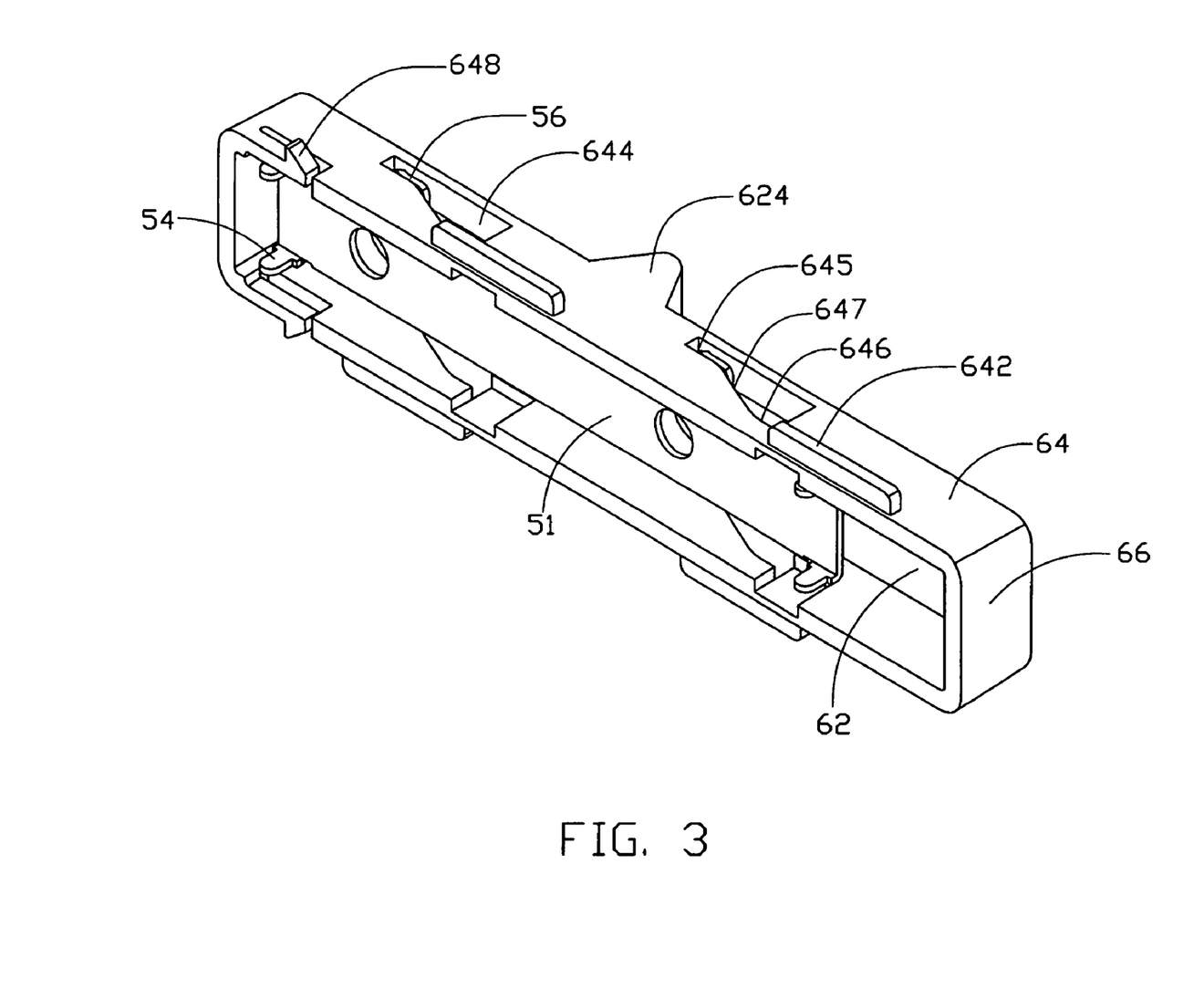
FIG. 3 is an enlarged, isometric view of an assembly of the operating member and the locking member in FIG. 1, and viewed from another aspect.

In assembly, the locking member 50 is put into the housing of the operating member 60 with the sliding tab 56 inserting into the slot 644 (as shown in FIG. 3). The locking member 50 is combined to the operating member 60 thereby. Then, the operating member 60 abuts against the first side wall 34 of the storage bracket 30, with the nuts 342 inserting into the apertures 52 of the locking member 50. The rails 642 of the operating member 60 slide into the guiding tabs 346 of the first side wall 34, and the hooks 648 slide past the limiting tabs 348 thereunder. During the operation, the locking member 50 is kept in place by the nuts 342. The locking member 50 will not move along with the operating member 60, since the sliding tabs 56 of the locking member 50 is movable within the slot 644 of the operating member 60. Each nut 342 has a coil spring 70 fixed therearound extending through the opening 622 of the operating member 60. A screw 80 is threaded into the nut 342 to compress the spring 70. The locking member 50 is pressed against the first side wall 34 of the storage bracket 30 by the springs 70. It is understood that an inner diameter of the coil spring 70 is greater than an outer diameter of the nut 342, and less than a diameter of the head of the screw 80. The securing means 40 is attached to the first side wall 34 of the storage bracket 30 thereby.

Figure 4:
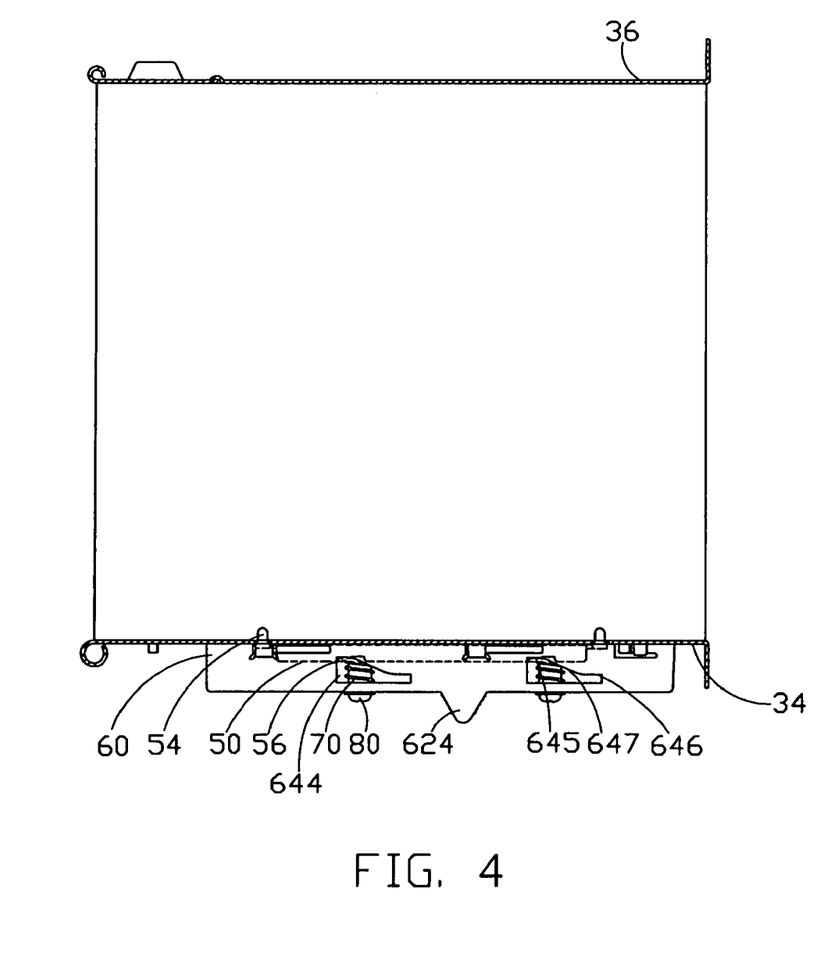
FIG. 4 is a schematic top section view of the combination of the operating member and the locking member.

Before installation of a storage device, the operating member 62 is in a first position. The hooks 648 abut against the limiting tabs 348. The sliding tabs 56 of the locking member 50 stay at the first horizontal portion 645 of the slot 644. The body of the locking member 50 abuts against the first side wall 34 under the pressure of the spring 70. The inserting pins 54 of the locking member 50 extend through the through holes 344 on the storage bracket 30 (referring to FIG. 4).

Figure 5:
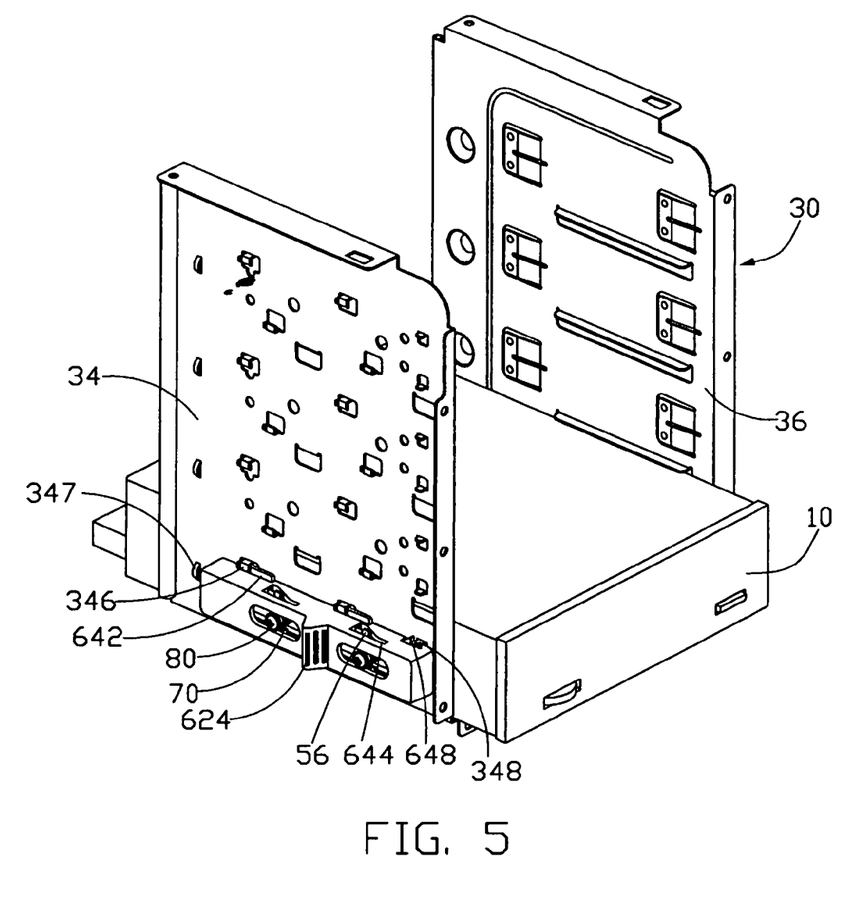
FIG. 5 is an assembled view of FIG. 1;.
Figure 6:
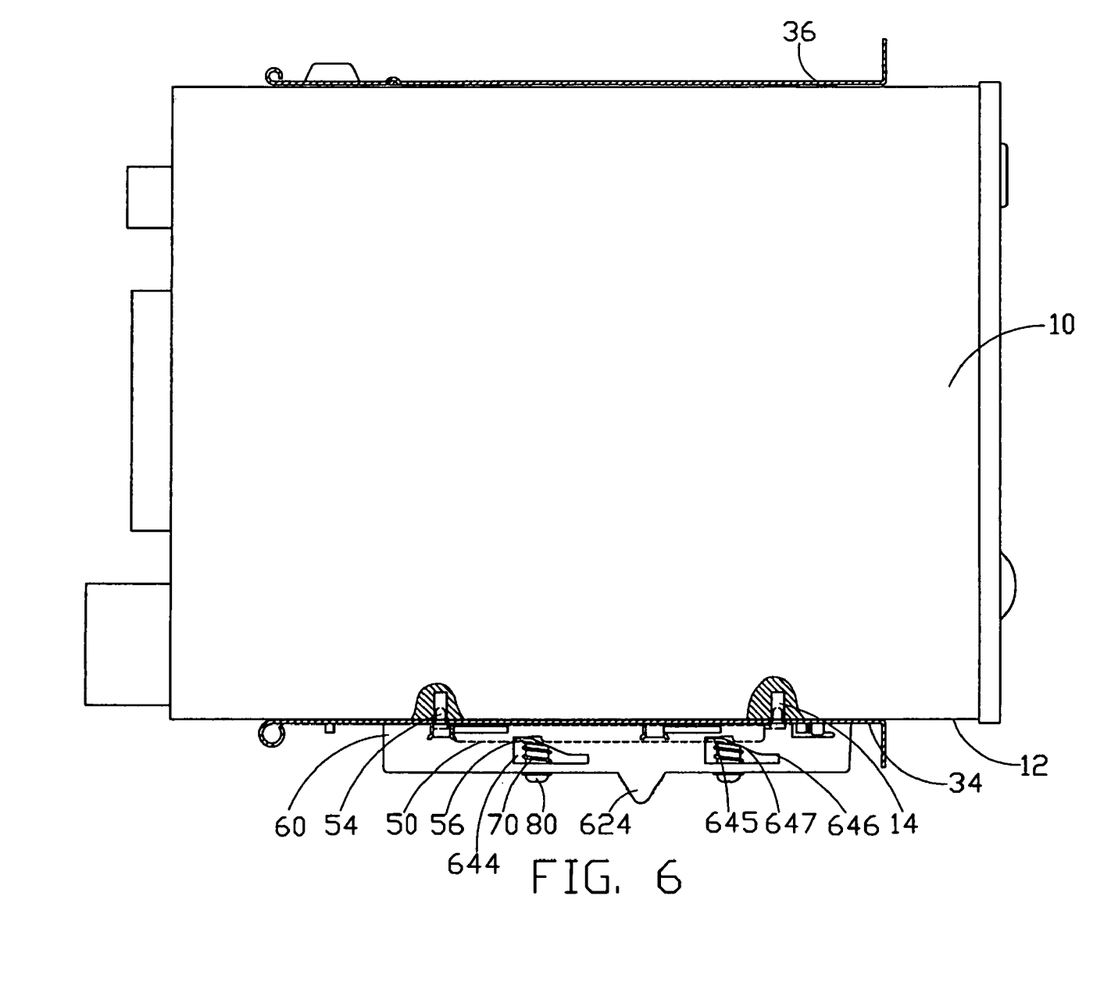
FIG. 6 is a schematic top section view of the present invention, showing the data storage device being inserted into the drive bracket.

When a storage device is installed, the operating member 60 is pushed rearward. The sliding tab 56 of the locking member 50 is edged out by the slant section 647. The sliding tab 56 slides past the slant section 647 to the second horizontal section 646 of the slot 644. The whole locking member 50 is lifted, and the extending pins 54 are withdrawn from the through holes 344 of the first side wall 34. After the storage device is inserted therein, the operating member 60 is pushed forwardly. Referring to FIG. 5, the sliding tab 56 of the locking member 50 slides down the slant section 647 again to the first horizontal section 645 of the slot 644. Also referring to FIG. 6, under the pressure of the spring 70, the locking member 50 abuts against the first side wall 34. The inserting pins 54 extend into the apertures 14 of the storage device 10 through the through holes 344 of the first side wall 34. The storage device 12 is secured into the storage bracket 30 thereby.

Figure 7:
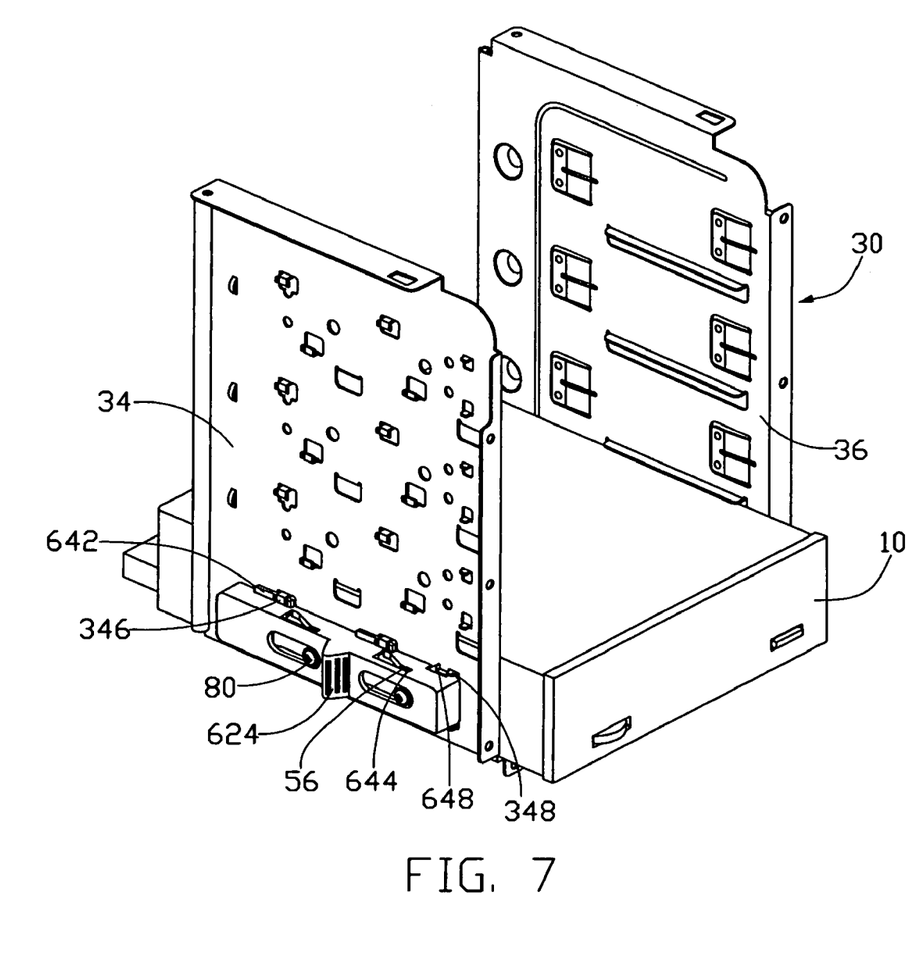
FIG. 7 is similar to FIG. 4, but showing the data storage device ready to be removed.
Figure 8:
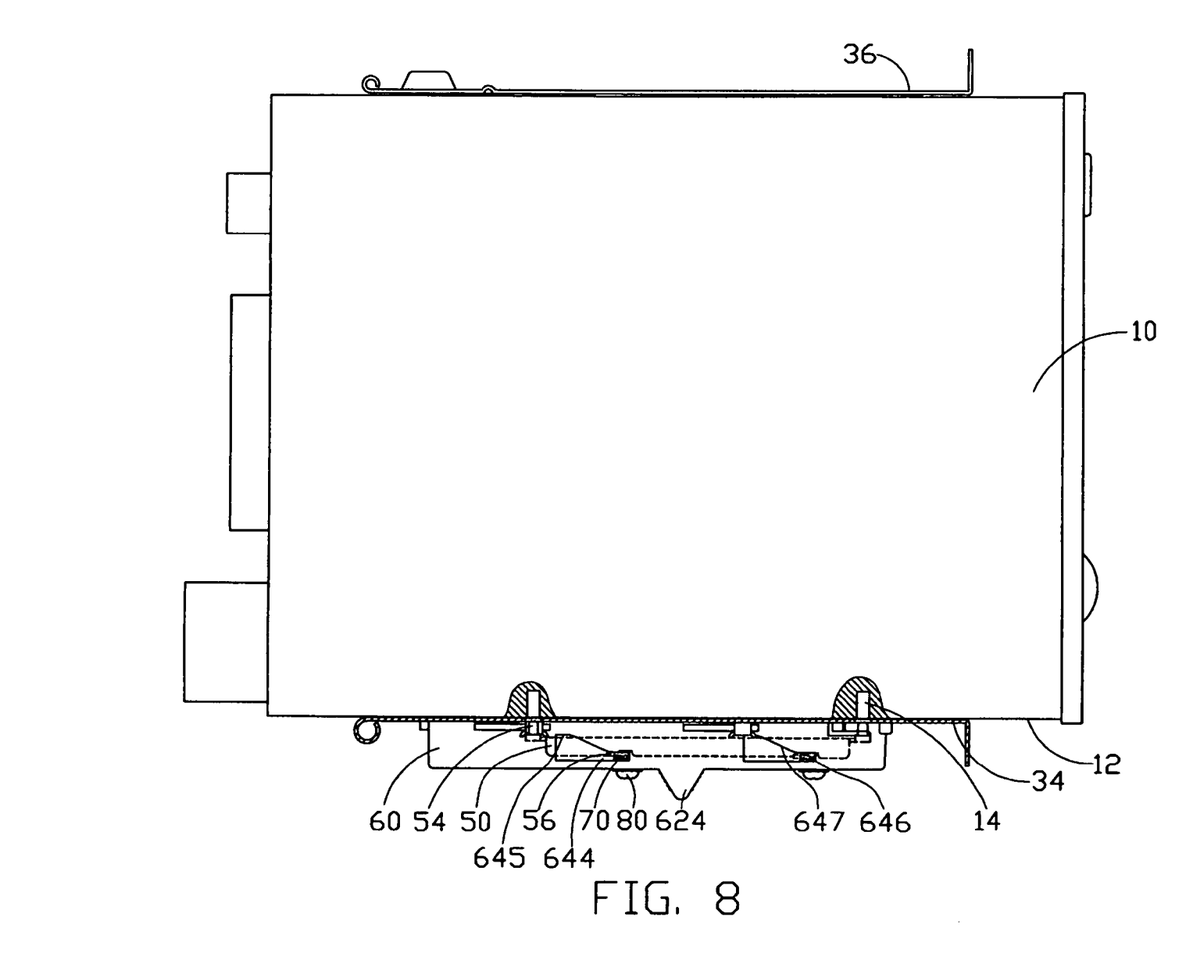
FIG. 8 is similar to FIG. 5, but showing the data storage device ready to be removed.

When the storage device 10 is removed, the operating member 60 is pushed rearward again. The sliding tab 56 of the locking member 50 is edged out by the slant section 647. The sliding tab 56 slides past the slant section 647 to the second horizontal section 646 of the slot 644. The whole locking member 50 is lifted, and the extending pins 54 are withdrawn from the through holes 344 of the first side wall 34 (as shown in FIGS. 7 and 8). It is ready to draw the storage device 10 out of the storage bracket 30.

In an alternative embodiment of the present invention, a screw extends through the aperture 52 on the locking member 50, and engages with the first side wall 34 directly, instead of the screw 80 engaging with the nut 342 in the preferred embodiment (referring to FIG. 2). The screw also has a coil spring 70 fixed therearound.

It is understood that the invention may be embodied in other forms without departing from the spirit thereof. Thus, the present example and embodiment t is to be considered in all respects as illustrative and not restrictive, and the invention is not to be limited to the details given herein.

What is claimed is:

1. A mounting apparatus for a storage device, comprising:
   a storage bracket;
   an operating member having at least one slant portion, a first horizontal portion, and second horizontal portion, the slant portion disposed between the first horizontal portion and the second horizontal portion;
   a locking member restrained from moving along with the operating member, the locking member having at least one inserting pin and at least one sliding tab; and
   resilient means for urging said inserting pin of the locking member to extend into the storage bracket; whereby
   the inserting pin of the locking member is lifted out of the storage bracket by the slant portion of the operating member edging the sliding tab of the locking member out, when the operating member is pushed.

2. The mounting apparatus as claimed in claim 1, wherein the storage bracket has a first side wall.

3. The mounting apparatus as claimed in claim 2, wherein at least one nut is disposed on the first side wall for inserting into the locking member, thereby restraining the locking member from moving along with the operating member.

4. The mounting apparatus as claimed in claim 3, wherein the resilient means comprises a coil spring fixed around the nut, and a screw is threaded into the nut to press the spring toward the locking member.

5. The mounting apparatus as claimed in claim 2, wherein at least one screw extends through the locking member, and engages with the first side wall, thereby restraining the locking member from moving along with the operating member.

6. The mounting apparatus as claimed in claim 5, wherein the resilient means comprises a coil spring fixed around the screw, and the spring is compressed by the screw.

7. The mounting apparatus as claimed in claim 2, wherein a range is defined on the first side wall for the operating member.

8. The mounting apparatus as claimed in claim 1, wherein at least one pair of rails is formed on the operating member, and at least one pair of guiding tabs is formed on the first side wall for guiding the rails.

9. The mounting apparatus as claimed in claim 1, wherein the slant portion, the first horizontal portion and the second horizontal portion are on a hypotenuse of a cuneal slot.

10. The mounting apparatus as claimed in claim 1, wherein the sliding tab of the locking member has a horizontal section and an inclined section.

11. A mounting apparatus assembly comprising:
a storage device;
a storage bracket for holding the storage device therein having a side wall, the side wall comprising at least one pair of guiding tabs formed thereon;
an operating member having at least one slant portion, and at least one pair of rails formed thereon for slidably engaging with said at least one pair of guiding tabs;
a locking member restrained from moving along with the operating member, the locking member having at least one inserting pin and at least one sliding tab; and
resilient means for urging the inserting pin of the locking member to extend into the storage device; whereby
the inserting pin of the locking member is lifted out of the storage device by the slant portion of the operating member edging the sliding tab of the locking member out, when the operating member is pushed.

12. The mounting apparatus assembly as claimed in claim 11, wherein at least one nut is disposed on the side wall of the storage bracket for inserting into the locking member, thereby restraining the locking member from moving along with the operating member.

13. The mounting apparatus assembly as claimed in claim 12, wherein the resilient means comprises a coil spring fixed around the nut, and a screw is threaded into the nut to press the spring toward the locking member.

14. The mounting apparatus assembly as claimed in claim 11, wherein at least one screw extends through the locking member, and engages with the side wall of the storage bracket, thereby restraining the locking member from moving along with the operating member.

15. The mounting apparatus assembly as claimed in claim 14, wherein the resilient means comprises a coil spring fixing around the screw, and the spring is pressed by the screw toward the locking member.

16. The mounting apparatus assembly as claimed in claim 11, wherein the operating member has a first horizontal portion and a second horizontal portion, and the slant portion is between the first horizontal portion and the second horizontal portion.

17. The mounting apparatus assembly as claimed in claim 16, wherein the slant portion, the first horizontal portion and the second horizontal portion are on a hypotenuse of a cuneal slot.

18. A mounting apparatus assembly, comprising:
a data storage device defining an aperture in at least one side face;
a storage bracket defining a cavity receiving said data storage device therein;
an operating member being moveable relative to the bracket in a front-to-back direction between locking and unlocking positions, and defining a guiding path, the operating member comprising at least one slant portion, at least one first horizontal portion, and at least one second horizontal portion, said slant portion disposed between the corresponding first horizontal portion and the corresponding second horizontal portion; and
a locking member detachably attached to the storage bracket and comprising at least one sliding tab engaged with the at least one slant portion of the operating member and actuated to linear slide, corresponding to movement of the operating member and said guiding path, relative to the bracket in a lateral direction perpendicular to said front-to-back direction, the locking member having at least one inserting pin aligned with the aperture in said lateral direction.

19. The mounting apparatus assembly as claimed in claim 18, wherein a spring is provided to urge the locking member toward the data storage device so as to have the inserting pin latchably received in the aperture.

20. The mounting apparatus assembly as claimed in claim 18, wherein at least one pair of rails is formed on the operating member, and at least one pair of guiding tabs is formed on a side wall of the storage bracket for guiding the rails.

* * * * *